United States Patent Office 3,423,345
Patented Jan. 21, 1969

3,423,345
EPOXY SYSTEM
Howard L. Hsu and Eugene R. Du Fresne, Chicago, Ill., assignors to General Dynamics Corporation, New York, N.Y., a corporation of Delaware
No Drawing. Filed Oct. 11, 1965, Ser. No. 494,923
U.S. Cl. 260—18                    5 Claims
Int. Cl. C08g 30/14

ABSTRACT OF THE DISCLOSURE

The rate of cure of a solvent based epoxy resin-amine or amide curing agent system is controlled by formation of an amine carbamate. $CO_2$ is reversibly added to the system either to the amino curing agent prior to admixture or to the uncured composition. The equilibium is controlled by application of Le Chatelier's principles; thus storage of the system at low temperature under $CO_2$ extends the pot life and application of vacuum or diluent gas promotes the cure.

---

This invention relates to epoxy resins and more particularly to improved epoxy resin-curing agent systems and to processes for making and utilizing the same.

Conventional epoxy resin-curing agent systems are generally packaged in two separate units and thus are sometimes referred to as "two-package" systems. To use such a two-package system, the epoxy resin and the curing agent are generally mixed together just before each application. Two general types of curing agents are used: those which catalytically cause a reaction of one epoxy resin molecule directly with another epoxy resin molecule, and those which are cross-linking agents and directly react with the epoxy resin molecules so as to become coupled directly into the cured products as structural members of the molecular network. The products which result from the use of these two types of curing agents vary in physical properties from one another. Depending upon the particular properties which it is desired that the resultant product should have, it may be advantageous to use one or the other types of curing agents.

The discussion hereinafter is restricted to crosslinking curing agents. Upon mixing, the epoxy resin and the crosslinking curing agent start to react immediately. As the polymerization or crosslinking action proceeds, the viscosity of the solution accordingly increases until it reaches the stage of a solid gel, at which stage the nonused mixture becomes no longer generally useful. Thus, the useful working life of the system is rather limited, usually up to several hours time, depending upon the particular epoxy resin, particular curing agent, solvent, solids content, temperature, volume, etc. of the mixture.

These limitations on "pot-life" have various disadvantages. So as not to exceed the useful pot-life of a particular epoxy resin-curing agent system, it may be necessary to make more than one batch of the material for use in a single eight-hour working day. Whatever material remains unused at the end of the working day is generally wasted. The daily (or more frequent than daily) mixing of relatively small batchs of such epoxy resin-curing agent systems consumes employee time and inherently results in various slight differences in composition. Thus, despite close quality control (which quality control itself may become a significant cost factor), the quality and uniformity of the resultant product may not achieve the desired degree of uniformity. Epoxy resin-curing agent systems which avoid these disadvantages are desired.

It is a principal object of this invention to provide improved epoxy resin-curing agent systems. It is a more particular object of this invention to provide a one-package epoxy resin-crosslinking system having extended pot-life. It is another object to provide processes for providing improved epoxy resin-curing agent systems. It is a further object to provide a method for extending the pot-life of epoxy systems. It is a still further object to provide processes for improved utilization of epoxy resin-curing agent systems. These and other objects of the invention are more particularly set forth in the following detailed description of products and processes embodying various features of the invention.

It has been found that a stable one-package epoxy system can be provided by inactivating an organic amine or amide curing agent by causing it to react with carbon dioxide to form the carbamate thereof. By employing the carbmate of a particular organic amine or amide curing agent, the pot-life of a system can be extended from a period measured in minutes or hours to a period measured in weeks. Suitable amine and amide cross-linking agents are readily convertible to the respective carbamate. An important aspect of this reaction is its reversibility, which allows the carbamate to be readily decomposed to give off carbon dioxide and form the reactive amine or amide when it is desired to harden the epoxy system.

The invention is applicable generally to epoxy resins. Epoxy resins are thermosetting materials which are easily converted to tough, infusible solids by the simple addition of a curing agent. The usefulness of the invention is easily demonstrated by reference to a class of epoxy resins having the most widespread present use, the condensation products of the reaction between a polyhydroxy compound and a compound containing an epoxy group, i.e. a three-membered ring containing one atom of oxygen and two atoms of carbon. Probably the most common epoxy resin in present use is the reaction product of epichlorohydrin with a dihydric alcohol, such as bisphenol A. This epoxy resin is referred to at various instances in the following description. It should be understood however that the invention is generally applicable to epoxy resins which react with organic amine or amide crosslinking agents to form a network which is crosslinked in three dimensions.

The reactions between the organic amine and amide crosslinking agents and the epoxy resins are well known. It is also well known that the use of a particular crosslinking agent with a particular epoxy resin produces a resultant product having certain properties which may vary in degree from the corresponding properties of other epoxy systems. These considerations hold equally true for the epoxy systems of the present invention inasmuch as, when the carbamate decomposes to carbon dioxide and the amine or amide, the resultant reaction between the amine or amide and the epoxy resin is that which would occur had it never been in the form of the carbamate. Of course, the carbamate should be compatible with the particular epoxy resin with which it is used.

It has been found that the provision of a stable one-package epoxy system is dependent upon the inclusion therein of a solvent which is a mutual solvent for both the epoxy resin and for the organic amine or amide cross-linking agent. For the epoxy system to exhibit the desired extended stability and uniformity in application, it has been found that the epoxy resin and the crosslinking agent should be dissolved in a sufficient amount of a mutual solvent to provide a homogeneous solution. Generally, homogeneity can be accomplished in a solution which contains up to about 80% solids, i.e. 20% by weight solvent.

Any suitable solvent in which the epoxy resin and the carbamate are mutually soluble may be employed. It is believed that the most commonly available, suitable solvents are the solvent family of ether-alcohols. Preferably, the alkyl ethers of ethylene glycol are employed. Particularly suitable solvents are the methyl, ethyl, butyl, and hexyl ethers of ethylene glycol which are commercially available under the names, methyl Cellosolve, Cellosolve, etc.

As stated above, the carbamate of the organic amine or organic amide crosslinking agent should be compatible with the epoxy resins employed. It has been found that four general classes of organic amines and organic amides form carbamates which are compatible with epoxy resins. These four classes of crosslinking agents are the straight chain polyamines, the straight chain substituted polyamines, the long chain unsaturated alkyl diamines and certain polyamides.

The first class of suitable crosslinking agents, the straight chain polyamines, should have a chain length long enough to contribute to good compatibility of their carbamates with epoxy resins. For this purpose, it is believed that the chain length of carbon and nitrogen atoms should be at least seven atoms long. For instance, diethylene triamine (DETA) is one example of a suitable straight chain polyamine. Other examples include, but are by no means limited to, tetraethylene pentamine (TEPA), triethylene tetraamine (TETA) and imino-bis-propylamine.

In the second group, it has been found that substituted polyamines having hydroxyl or hydroxylalkyl groups on the nitrogen atoms show excellent compatibility with the epoxy resins. Examples of such polyamines which form compatible carbamates include N-(2-hydroxypropyl) ethylene diamine, which is sold under the name "Monolene." Other examples include N-(hydroxyethyl) diethylene triamine and N-N'-bis (hydroxyethyl) diethylene triamine, mixtures of which are sold under the designations ZZLB–0814 (Union Carbide) and T–I (Shell Chemical).

The third class of amines mentioned above, long chain unsaturated alkyl amines, should likewise have a chain of sufficient length to contribute to both good solubility in a suitable mutual solvent and to compatibility of its carbamate with epoxy resins. Fatty diamines are one example of suitable substances. Preferably, a diamine of an unsaturated monocarboxylic acid having 12 to 22 carbon atoms in the main chain is employed. Examples of such amines include Duomeen O and DIAM 11 (oleic 1, 3 propylene diamine), Duomeen S (soya, 1, 3 propylene diamine) and Duomeen L-11 (a beta-amine, having the formula $C_9H_{19}CH \cdot (CH_3) \cdot NH \cdot C_3H_6NH_2$). Mixtures of compatible members of these crosslinking agents may also be employed, if desired.

Polyamides which have been found to form carbamates which are compatible with the epoxy resins are those polyamides having a chemical formula of $$HO(OCRCONHR'NH)_nH$$

wherein R and R' are alkyl groups. Examples of suitable polyamides include, but are by no means limited to, condensation polymers of dimerized (and trimerized) vegetable oil, unsaturated fatty acids, and aryl or alkyl polyamines, such as those commercially marketed as Versamid 100, 115, 125 and 140.

The relative amount of crosslinking agent which is employed naturally varies with the particular epoxy resin being used. It can be generally said that the organic amine crosslinking agents enumerated in the first three classes above are employed in equal stoichiometric amounts to the equivalent amount of epoxide that is included in the epoxy resins used. The polyamides, which constitute the fourth class of crosslinking agents enumerated above, may be used in various proportions to the equivalent amount of epoxide present in the epoxy resin. Variations in the equivalent amount of polyamide employed provide epoxy systems having formulations which give films of varying properties, from flexible and tough to hard and impact-resistant.

As previously stated, the improved epoxy system is achieved by chemically changing the cross-linking agent to the carbamate form by treating it with gaseous carbon dioxide. The reaction is a simple one which is fully reversible. As in the case of any reversible reaction, the direction in which the reaction proceeds is dictated by the relative amounts of the constituents which are present, and the temperature and pressure. Obviously, the conditions vary for the reaction of any individual amine or amide to its respective carbamate. The equation below is indicative of one such reaction:

$$H_2NC_2H_4NHC_2H_4NHC_2H_4NH_2 + 2CO_2 \rightarrow$$
$$HOOCNHC_2H_4NHC_2H_4NHC_2H_4NHCOOH$$

The above reaction proceeds to the right to form the carbamate whenever the temperature is at 50° C. or below and the pressure is at one p.s.i.a. or above. Similar temperature and pressure conditions are either well known or can be easily determined by one skilled in the art to form the carbamates of the other organic amines or amides mentioned above.

It has been found that the crosslinking agent may be in the carbamate form when it is put into solution with the epoxy resin or that it may be put into solution as an organic amine or amide, as the case may be, and then changed to the carbamate form before significant reaction occurs between the amine or amide and the epoxy groups. Although transformation to the carbamate before mixing is preferred, at relatively low temperatures, e.g. about 50° C. and lower, the crosslinking reaction between the amine or amide and the epoxy resin proceeds relatively slowly so that treatment to form a stable carbamate may be carried out before a substantial amount of crosslinking occurs. Similarly, increasing the pressure favors the formation of the carbamate.

It has been found that by exposing the liquid solution of epoxy resin and curing agent to an atmosphere of carbon dioxide, the carbon dioxide diffuses into the solution sufficiently rapidly to change the available amine or amide to the carbamate before substantial crosslinking occurs. In general, the rate of reaction of the carbon dioxide upon the amine or amide is so much faster than the crosslinking reaction that if the solution is placed in a $CO_2$ atmosphere soon after mixing has taken place, substantial crosslinking is prevented. Although, as previously stated, increased pressure of carbon dioxide is helpful in driving the reaction toward the formation of carbamate, it is believed that exposure of the solution to carbon dioxide at normal atmospheric pressure is adequate to complete the transformation of the amine or amide to the carbamate before substantial crosslinking occurs.

Comparison of the pot-lives of epoxy systems made with a particular epoxy resin and a particular amine or amide crosslinking agent with a similar epoxy system made with the same epoxy resin and the equivalent amount of the same crosslinking agent in the form of the carbamate thereof provides a striking illustration of an important feature of the invention. Whereas the ordinary epoxy system, made with an amine crosslinking agent, gels in less than one-half days time upon exposure to ordinary air at room temperature, the comparable epoxy system using the respective carbamate instead of the amine does not reach a comparable gel state until two days pass, under exposure to ordinary air at room temperature. This increase in pot-life of over 300% can be put to significant advantage in alleviating many industry problems.

Even more striking is the increase in pot-life which is obtained through storage of the epoxy-curing agent solution under a carbon dioxide atmosphere. One system which has a pot-life of less than a half-day when stored under ordinary air is found to have a pot-life of eight days when stored under a carbon dioxide atmosphere. Moreover, if the solution is initially made with the carbamate (to prevent initial crosslinking) and is then stored under a carbon dioxide atmosphere, gelling does not occur for 13 days. These extremely large increases in pot-life of epoxy systems provide significant advantages which industries may utilize in various ways. The extended pot-lives of these epoxy-systems increase the versatility of these epoxy systems and make them much more attractive for various applications for which their relatively short pot-lives may have been undesirable.

When a carbamate crosslinking agent is added to a solution containing the desired epoxy resin in the selected solvent and mixing is carried out to provide a homogenous solution, the mixing action may tend to drive off the carbon dioxide which is in equilibrium with the amine or amide and thus create some additional amine or amide which would become available for immediate crosslinking of the epoxy resin. To prevent this occurence, it may be advisable to either slowly mix the final solution, or to carry out the mixing under a $CO_2$ atmosphere which procedure may further slightly extend the pot-life of the epoxy system whether it is stored under air or under carbon dioxide. Mixing under a $CO_2$ atmosphere is considered optional because the increase in pot-life which results from storage under a $CO_2$ atmosphere is of such a relatively larger magnitude that, for a given application, this further step of mixing under a $CO_2$ atmosphere may be unwarranted.

Theory shows, and test results bear out the fact, that by increasing the pressure of the carbon dioxide atmosphere under which the epoxy system is stored the pot-life of the epoxy system can be still further extended. The amount of further extension which can be achieved by storage under pressures of carbon dioxide higher than one atmosphere is inherently limited by the equilibrium reaction. The actual amount of extension varies with regard to the particular epoxy resin and the particular crosslinking agent which make up the system. Certain systems permit a greater extension than others. A representative figure is considered to be that an epoxy system made of an epoxy resin and carbamate which would have a pot-life of 13 days if stored under one atmosphere of carbon dioxide at room temperature would have a pot-life of about 39 days if stored under 7 atmospheres of carbon dioxide and room temperature. In many cases, it may be inconvenient to carry out storage under carbon dioxide pressures of greater than one atmosphere to achieve this still further extension of pot-life. Thus, it is expected that most often it will be suitable to store the epoxy system under a one atmosphere of carbon dioxide rather than attempt to take advantage of this still further extension of pot-life.

Various processes may be employed in the application of these epoxy systems to accelerate the hardening thereof. As stated above, the transformation of the crosslinking agent to the carbamate form inactivates the crosslinking agent and thus preserves and extends the pot-life of the epoxy system. When the time for use of the epoxy system arrives, it is desirable to quickly reactivate the curing agent by returning the carbamate to the amine or amide form so cross-linking will readily proceed. Various processes may be used to accelerate this transformation back.

Mere exposure of the system to the air results in removal of the carbon dioxide from the vicinity thus changing the equilibrium and driving the reaction toward formation of the amine or amide. When the epoxy system is used as an adhesive, it is often applied in a very thin film which greatly facilitates the diffusion of the carbon dioxide into the surrounding atmosphere from the relatively large surface area with a consequent fast-curing of the epoxy system. Moreover, the large surface area also provides rapid vaporization of the solvent and thereby facilitates the hardening of the epoxy system.

If instead of being used as a surface coating or as an adhesive, wherein a thin film is likely used, the epoxy system is employed for other purposes, for example as a casting resin, other means may be employed to facilitate hardening. Vigorous stirring action of the epoxy system before casting hastens decomposition of the carbamate by driving off the carbon dioxide from the solution into the surrounding atmosphere. Sparging by bubbling air or an inert gas through the solution has a like effect. Heating the mixture also accelerates decomposition of the carbamate.

To provide very quick hardening of the epoxy system, whether it is being used as a surface coating, as a casting resin, or otherwise, the applied epoxy system is subjected to vacuum conditions. Use of a vacuum provides excellent removal of the carbon dioxide and thus drives the reversible action toward the amine or amide at a very fast rate.

When the epoxy system is being applied in a thin layer, as when it is being used for surface coating purposes, a very efficient method of applying it is by spraying, using compressed air or some other inert gas. Application of the epoxy system in this manner has numerous advantages. A uniform layer of the coating is deposited upon the desired surface. The flow of air intimate contact with the carbamate promotes the decomposition of the carbamate into carbon dioxide and the amine or amide. The flow of air which finely atomizes the particles of the solution facilitates rapid vaporization of the solvent. Accordingly, for applications that lend themselves to spraying with the epoxy systems, the epoxy resin-carbamate system is considered both becasue it has good pot-life before spraying and because the act of spraying hastens the hardening of the epoxy system.

As can be seen from the foregoing description, the invention discloses a one-package epoxy system which is ideally suited for surface-coating applications which currently consume a large volume of the epoxy resin production in the United States. The greatly extended useful working life of the improved epoxy resin system can be responsible for substantial reductions in labor and operating costs, such as less waste of material, decreased production time and increased production efficiency. A large batch of epoxy, sufficient to meet the daily demand for several weeks may be prepared at one time, whereas previously the epoxy resin systems were mixed in small quantities which could be consumed within several hours. Operation in this manner obviously eliminates the waste of the material which was left at the end of a working day. Moreover, this pre-mixed system results in better quality and greater uniformity of resulting products. Small batches made everyday undoubtedly show slight variations despite even close quality control, whereas a large batch offers uniform quality for several weeks without daily quality control checks.

In addition to these important advantages which result from the extended pot-life, additional advantages are present in the improved epoxy resin system because of the chemical and physical properties of the carbamate as opposed to those of the organic amine or amide. Various unmodified crosslinking agents are toxic under even brief exposure and are skin irritants which may cause dermatitis or other disorders. The formation of the carbamate alters the basic structure of the amine group and significantly reduces the harmful pharmacological activity of it. Because the carbon dioxide neutralizes the highly alkaline amine, the solvent power previously possessed by the amine is decreased. Accordingly, the improved epoxy system is easier and safer to prepare and to apply and the storage vessel and/or piping systems may be made of inexpensive materials because alkali and solvent-resistant material is no longer required. Furthermore, the volatility which is a property of unmodified amines is drastically reduced. This results in both a reduction in vaporization and loss of an amine curing agent which contributes to better and more uniform quality control, viz the heat generated during curing might possibly cause enough loss of the volatile amine curing agent from the stoichiometric amount employed to result in an under-cured epoxy product. In the improved epoxy resin system, the exothermic heat is absorbed before the amine is present and therefore before the amine is subject to vaporization.

A still further advantage is a reduction in flammability of the improved epoxy system. Decomposition of the carbamate gives off carbon dioxide which tends to cover the solution like a blanket and thereby insulate it from the surrounding air, thereby contributing to the cause of safety both in the preparation and in the application of epoxy systems.

The following examples illustrate processes and improved epoxy systems embodying various features of the invention. It should be understood however that these examples are set forth for the purpose of illustrating the best mode presently known by the inventors for carrying out their invention and that these examples should not be understood to limit the scope of the invention which is defined by the claims appearing at the end of this specification.

EXAMPLE I

An epoxy resin system suitable for a surface-coating application is made by dissolving 100 grams of epoxy resin EPON 1001 (a condensation product of epichlorohydrin and bis-phenol having a hydroxyl equivalent of 130 and an epoxide equivalent of 450–525) and about 5.5 parts per hundred parts by weight of epoxy resin (phr.) of imino-bis-propylamine in an equal amount by weight of methyl Cellosolve, the methyl ether of ethylene glycol. The mixture is stirred until a homogeneous solution is achieved. The solution is split into two halves which are hereinafter referred to as Samples A1 and B1. A similar solution is prepared from precisely the same amount of epoxy resin and methyl Cellosolve; however, instead of using the amine, the carbamate of the amine is employed. The carbamate is produced by exposing imino-bis-propylamine to gaseous carbon dioxide at 20° C. and 15 p.s.i.a. for about an hour. After slowly stirring to produce a homogeneous solution, this epoxy resin-carbamate solution is also split into two halves which are hereinafter referred to as Samples C1 and D1. Samples A1 and C1 are left exposed to the ordinary atmosphere at room temperature, whereas Samples B1 and D1 are immediately placed in a closed box at room temperature under carbon dioxide at one atmosphere pressure.

Minor portions of the ungelled samples are tested daily. It is considered that gelling occurs when a system reaches a semi-solid state and thus does not retain satisfactory fluidity for a surface-coating operation. Observation of the samples shows that Sample A1 gels in less than about 4 hours. Sample C1 reaches this gel state after two days have passed. Sample B1 requires eight days' time before this gel state is reached. Sample D1 does not reach this gel state until 13 days.

The increase in pot-life achieved via the use of the carbamate is readily apparent. Stored under natural atmospheric conditions, an epoxy resin solution employing the carbamate instead of the particular amine has a pot-life over four times as long as the comparable system employing the amine. Moreover, by merely storing the conventional epoxy system under a carbon dioxide atmosphere, the pot-life is increased more than 15 times; and furthermore, by employing the carbamate and storing this system under a $CO_2$ atmosphere, the pot-life is increased more than 25 times.

EXAMPLE II

The procedure set forth in Example I is repeated using 100 grams of EPON 1001, together with 5.1 parts per hundred (phr.) of TETA, and an equal amount by weight of methyl Cellosolve, to provide Samples A2 and B2. Samples C2 and D2 are made in a similar manner except that an equivalent amount of the carbamate of TETA is substituted for the amine. The samples are stored under the conditions specified in Example I. Each day a small portion of each ungelled sample is tested, and they exhibit satisfactory fluidity properties for an epoxy system of this type. Sample A2 gels overnight, i.e. less than about 15 hours. Sample C2 gels in two days. Samples B2 and D2 gel in 6 and 13 days, respectively.

EXAMPLE III

The procedure of Example II is repeated using 5.6 parts per hundred of TEPA to produce Samples A3 and B3 and using the carbamate thereof to produce Samples C3 and D3. Daily testing of small portions of each ungelled sample shows that satisfactory adhesive properties are maintained. Sample A3 gels overnight. Sample C3 gels in two days. Samples B3 and D3 gel in 10 and 13 days, respectively.

EXAMPLE IV

The procedure of Example II is repeated using 7.7 phr. of ZZL–0814, a mixture containing about 85% N-(hydroxyethyl) diethylene triamine and about 15% N,N'-bis (hydroxyethyl) diethylene triamine to makes Samples A4 and B4. Samples C4 and D4 are made using the carbamate of this product. Testing of a small portion of each ungelled sample each day shows that they continue to exhibit satisfactory fluidity properties.

Observation of the samples, which are stored as in Example I, shows that Sample A4 gels overnight and that Sample C4 gels in three days. Sample B4 gels in about 15 days and Sample D4 gels in about 16 days.

EXAMPLE V

The procedure of Example II is repeated using 7.7 phr. of T–1, a mixture of N-(hydroxyethyl) DETA and N,N'-bis (hydroxyethyl) DETA plus bisphenol as an accelerator, to make Samples A5 and B5. Samples C5 and D5 are made using the respective carbamate. Daily testing of small portions of the ungelled samples show that they continue to exhibit satisfactory fluidity properties.

Sample A5 gels overnight, and Sample C5 gels in two days. Sample B5 gels in 8 days and Sample D5 gels in 16 days.

EXAMPLE VI

The procedure of Example II is repeated using 8.2 phr. of Monolene to make Samples A6 and B6. The respective carbamate thereof is employed to make Samples C6 and D6. Daily testing of the ungelled samples shows that they continue to exhibit satisfactory fluidity properties.

Observation shows that Sample A6 gels in one day and that Sample C6 gels in three days. Samples B6 and D6 gel in about 10 and about 14 days, respectively.

EXAMPLE VII

The procedure of Example II is repeated using 22.5 phr. of Duomeen O to make Samples A7 and B7. The respective carbamate thereof is employed to make Samples C7 and D7. The daily testing of the ungelled samples shows that they continue to exhibit satisfactory fluidity properties.

Observation of the samples shows that Sample A7 gels overnight while Sample C7 gels in 5 days. Sample B7 does not gel until 16 days pass and Sample D7 does not gel for 19 days.

EXAMPLE VIII

The procedure of Example II is repeated using 22.5 phr. of Duomeen S to make Samples A8 and B8. The respective carbamate thereof is employed to make Samples C8 and D8. The daily testing of the ungelled samples shows that they continue to exhibit satisfactory fluidity properties.

Observation of the samples shows that Sample A8 gels overnight while Sample C8 gels in 6 days. Sample B8 does not gel until 17 days pass, and Sample D8 does not gel for 21 days.

EXAMPLE IX

The procedure of Example II is repeated using 16 phr. of Duomeen L-11 to make Samples A9 and B9. The respective carbamate thereof is employed to make Samples C9 and D9. Daily testing of the ungelled samples shows that they continue to exhibit satisfactory fluidity properties.

Observation of the samples shows that Sample A9 gels overnight while Sample C9 gels in 4 days. Sample B9 does not gel until 19 days pass and Sample D9 does not gel for 24 days.

EXAMPLE X

The procedure of Example II is repeated using 22.5 phr. of DIAM-11 to make Samples A10 and B10. The respective carbamate thereof is employed to make Samples C10 and D10. The daily testing of the ungelled samples shows that they continue to exhibit satisfactory fluidity properties.

Observation of the samples shows that Sample A10 gels overnight while Sample C10 gels in 6 days. Sample B10 does not gel until 24 days have passed and Sample D10 does not gel for 24 days.

EXAMPLE XI

The procedure of Example I is repeated using 100 grams of EPON 1001 and 100 phr. of Versamid 100. The resin and amide are dissolved in about twice the amount by weight of a solvent mixture of 56% by weight methyl Cellosolve and 44% xylene. Storage is carried out as in Example I and daily testing of the ungelled samples shows that the samples continue to exhibit satisfactory fluidity properties.

Observation of the samples shows that Sample A11 gels in two days and that Sample C11 gels in 4 days. Samples B11 and D11 gel in 9 and 12 days, respectively.

Comparison of the results of the Examples I through XI shows that the use of carbamates greatly lengthens the pot-life of epoxy resin systems whether stored under normal air or under a carbon dioxide atmosphere. Moreover, comparison of the results shows that storage under a carbon dioxide atmosphere is strikingly effective in extending pot-life. Effective diffusion of the carbon dioxide into the solution of epoxy resin and crosslinking agent is effective to itself increase the pot-life of a conventional epoxy resin-curing agent system by a factor of from about 5 to 25 times its normal pot-life. This unexpected result is considered to be extremely significant and is believed to show that the equilibrium reaction between organic amine or amide and carbon dioxide to form the carbamate is predominant and/or occurs at a much faster rate than does the crosslinking reaction between the epoxy resin and the organic curing agent. Of course, the eventual gelling is a result of the inherent equilibrium relationship between the amine or amide and the carbamate which causes some organic amine or amide to be always present and therefore available to react with the epoxy groups.

Testing also shows the improved safety of epoxy systems employing carbamates. Testing shows that it takes about 20 seconds longer to ignite the carbamates of either TETA or TEPA than it takes to ignite TETA or TEPA, respectively, when exposed to similar conditions. For the carbamates of Monolene and imino-bis-propylamine the difference is about 8 to 12 seconds. For the carbamates of the Duomeen series of fatty diamines, when ignition by a flame is first attempted, sufficient carbon dioxide is released to smother the flame. The increased safety features of the improved epoxy systems can be of significant importance in various industrial applications.

Various features of the invention are set forth in the following claims.

We claim:

1. A method for extending the pot-life of an epoxy system made of a solution of an epoxy resin and an organic amine or amide crosslinking agent therefor, which method comprises storing said epoxy system under an atmosphere of carbon dioxide at a temperature of not higher than about 50° C. whereby carbon dioxide diffuses into said solution and reacts with said organic amine or amide to form the carbamate thereof.

2. A process for making an improved epoxy system comprising treating an organic amine or amide which is effective to crosslink epoxy resins with carbon dioxide under temperature and pressure conditions adapted to convert said organic amine or amide to the carbamate thereof, dissolving epoxy resin and said carbamate in a mutual solvent to form a homogeneous solution thereof, and storing said solution under a carbon dioxide atmosphere at a temperature not higher than about 50° C.

3. A method for making a liquid epoxy system having an extended pot-life, which method comprises dissolving epoxy resin and an organic crosslinking agent selected from the group consisting of straight chain polyamines having a main chain length of at least about seven carbon and nitrogen atoms, substituted polyamines having a main chain length of at least about five carbon and nitrogen atoms and having a hydroxyl or hydroxyalkyl group on a nitrogen atom in said chain, diamines of unsaturated monocarboxylic acids having about 12 to 22 carbon atoms, polyamides having the general formula

$$HO(OCRCONHR'NH)_nH$$

wherein R and R' are alkyl groups, and mixtures thereof, in a mutual solvent, and storing said solution system under an atmosphere of carbon dioxide whereby carbon dioxide at a temperature not higher than about 50° C. diffuses into said solution and reacts with said organic agent to form the carbamate thereof.

4. A method for employing an improved liquid epoxy system including an epoxy resin and an organic amine or amide crosslinking agent dissolved in a mutual liquid solvent, which method comprises storing said epoxy system under an atmosphere of carbon dioxide at a temperature not higher than about 50° C. to maintain said organic amine or amide crosslinking agent in the form of the carbamate thereof, applying said liquid epoxy system as desired, and then subjecting the applied epoxy system to vacuum conditions to promote vaporization of said solvent and the removal of carbon dioxide thereby increasing the rate of decomposition of the inactive carbamate to form the active crosslinking agent which reacts with the epoxy resin to form a hardened product.

5. A method for employing an improved liquid epoxy system including an epoxy resin and an organic amine or amide crosslinking agent dissolved in a mutual liquid solvent, which method comprises storing said epoxy system under an atmosphere of carbon dioxide at a temperature not higher than about 50° C. to maintain said organic amine or amide crosslinking agent in the form of the carbamate thereof, applying said liquid epoxy system as desired, and then subjecting the applied epoxy system to a current of air or inert gas to promote vaporization of said solvent and the removal of carbon dioxide thereby increasing the rate of decomposition of the inactive carbamate to form the active crosslinking agent which reacts with the epoxy resin to form a hardened product.

References Cited

UNITED STATES PATENTS

| | | | |
|---|---|---|---|
| 3,322,797 | 5/1967 | Holm | 260—47 X |
| 3,320,187 | 5/1967 | Burt | 260—47 X |
| 3,275,587 | 9/1966 | Weller et al. | 260—18 X |
| 3,151,095 | 9/1964 | Stone | 260—37 |

DONALD E. CZAJA, *Primary Examiner.*

C. WARREN IVY, *Assistant Examiner.*

U.S. Cl. X.R.

260—2, 33.2, 47, 830